US007112747B2

(12) United States Patent
Saito et al.

(10) Patent No.: US 7,112,747 B2
(45) Date of Patent: Sep. 26, 2006

(54) CABLE BUSH SECURELY FIXED TO A CABLE

(75) Inventors: Yuichi Saito, Akita (JP); Junichi Noro, Akita (JP); Kyuichi Sato, Akita (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/024,635

(22) Filed: Dec. 29, 2004

(65) Prior Publication Data

US 2005/0167142 A1 Aug. 4, 2005

(30) Foreign Application Priority Data

Feb. 2, 2004 (JP) ............................ 2004-025425

(51) Int. Cl.
*H02G 3/22* (2006.01)

(52) U.S. Cl. ............................ 174/152 G; 174/153 G; 174/65 G; 174/152 R; 16/2.1; 16/2.2; 248/56

(58) Field of Classification Search .............. 174/65 R, 174/65 G, 72 A, 74 A, 76, 93, 135, 142, 174/137 R, 153 A, 152 R, 152 G, 153 G, 174/152 A, 21 R, 21 C, 72 C, 88 C; 285/222, 285/222.1, 222.2, 223.3, 223; 16/2.1, 2.2; 248/56; 439/604, 587, 274, 275
See application file for complete search history.

(56) References Cited

U.S. PATENT DOCUMENTS 3,891,790 A * 6/1975 Kierstead .................... 174/93
4,849,582 A * 7/1989 Stevenson .................. 174/135
5,335,408 A * 8/1994 Cobb ........................... 29/447
6,930,252 B1 * 8/2005 Ootsuki ................... 174/72 A

OTHER PUBLICATIONS

Suzuki, "Method of Manufacturing Waterproof Wire Harness" US 2003/0006523.*

* cited by examiner

*Primary Examiner*—Angel R. Estrada
(74) *Attorney, Agent, or Firm*—Frishauf, Holtz, Goodman & Chick, PC

(57) ABSTRACT

A brass washer is mounted on a cable at one end portion of the cable by being staked to a skin of the cable. The skin of the cable is coated with polytetrafluoroethylene or PTFE. Subsequently, a bushing member is integrally molded on the washer to the cable by injection molding. The bushing member is made of polyvinyl chloride or PVC. Thereby, a cable bush is mounted on the cable such that the cable bush is securely fixed to the cable.

20 Claims, 4 Drawing Sheets

CABLE BUSH SECURELY FIXED TO A CABLE

This application claims priority to prior application JP 2004-25425, the disclosure of which is incorporated herein by reference.

BACKGROUND OF THE INVENTION

This invention relates to a cable bush mounted on a cable and, in particular, to a method for mounting the cable bush (bushing) on the cable which is used for connecting between a mobile antenna unit for receiving a digital radio broadcasting and a receiver (receiver body) and which has a skin coated with a slippery material.

In recent years, a digital radio receiver, which receives a satellite wave or a terrestrial wave to listen the digital radio broadcasting, has been developed and is put to practical use in the United States of America. The digital radio receiver is mounted on a mobile station such as an automobile and can receive an electric wave having a frequency of about 2.3 gigahertz (GHz) to listen in a radio broadcasting. That is, the digital radio receiver is a radio receiver which can listen in a mobile broadcasting. Inasmuch as the received wave has the frequency of about 2.3 GHz, a reception wavelength (resonance wavelength) $\lambda$ thereof is equal to about 128.3 mm. In addition, the terrestrial wave is an electric wave in which a signal where the satellite wave is received in an earth station is frequency shifted a little.

Inasmuch as the electric wave having the frequency of about 2.3 GHz is used in the digital radio broadcasting in the manner which is described above, it is necessary to set up an antenna outside the automobile. Accordingly, the antenna must be attached to a roof of the automobile in a case where the digital radio receiver is mounted in the automobile.

Such as an antenna for the automobile and a receiver (receiver body) put inside a room of the automobile are electrically connected to each other through a cable. On mounting the cable to the antenna for the automobile, it is necessary to hold one end portion of the cable in the antenna. For this purpose, the cable is mounted with a cable bush. The cable bush is also called a bushing.

The cable has a skin coated with a slippery material such as polytetrafluoroethylene or PTFE. In other words, the cable has a slippery skin. The bushing is made of polyvinyl chloride or PVC. Therefore, adhesion between the bushing and the cable is poor. When the cable is pulled, the bushing may slide on the skin of the cable thereby the bushing may shift on the cable. As a result, it is desired to mount the bushing on the cable with the bushing securely fixed to the cable.

SUMMARY OF THE INVENTION

It is therefore an object of the present invention to provide a method of mounting a bushing (cable bush) on a cable with the bushing securely fixed to the cable.

It is another object of the present invention to provide a cable bush which is cable of being securely mounted on a cable.

It is still another object of the present invention to provide a cable with a bushing wherein the bushing does not slide on the cable.

Other objects of this invention will become clear as the description proceeds.

On describing the gist of a first aspect of this invention, it is possible to be understood that a method is for mounting a cable bush on a cable having a skin. According to the first aspect of this invention, the above-mentioned method comprises the steps of staking a washer to the skin of the cable and integrally molding a bushing member on the washer to the cable.

On describing the gist of a second aspect of this invention, it is possible to be understood that a cable bush is mounted on a cable having a skin. According to the second aspect of this invention, the above-mentioned cable bush comprises a washer mounted on the cable with the washer stacked to the skin of the cable and a bushing member which is integrally molded on the washer to the cable.

On describing the gist of a third aspect of this invention, it is possible to be understood that a cable with a bushing where the bushing is mounted on the cable having a skin. According to the third aspect of this invention, in the above-mentioned cable, the bushing comprises a washer mounted on the cable with the washer staked to the skin of the cable and a bushing member which is integrally molded on said washer to the cable.

On describing the gist of a fourth aspect of this invention, it is possible to be understood that an antenna unit comprises a case, a cable pulled out of the case, and a bushing mounted on the cable. According to the fourth aspect of the invention, in the above-mentioned antenna unit, the bushing comprises a washer mounted on the cable with the washer staked to a skin of the cable and a bushing member which is molded on the washer to the cable.

In the first through the fourth aspects of this invention, the skin of the cable may be made of a slippery material such as polytetrafluoroethylene or PTFE. The bushing member may be made of polyvinyl chloride or PVC. The washer may be made of brass.

DESCRIPTION OF THE PREFERRED EMBODIMENT

Figure 1:
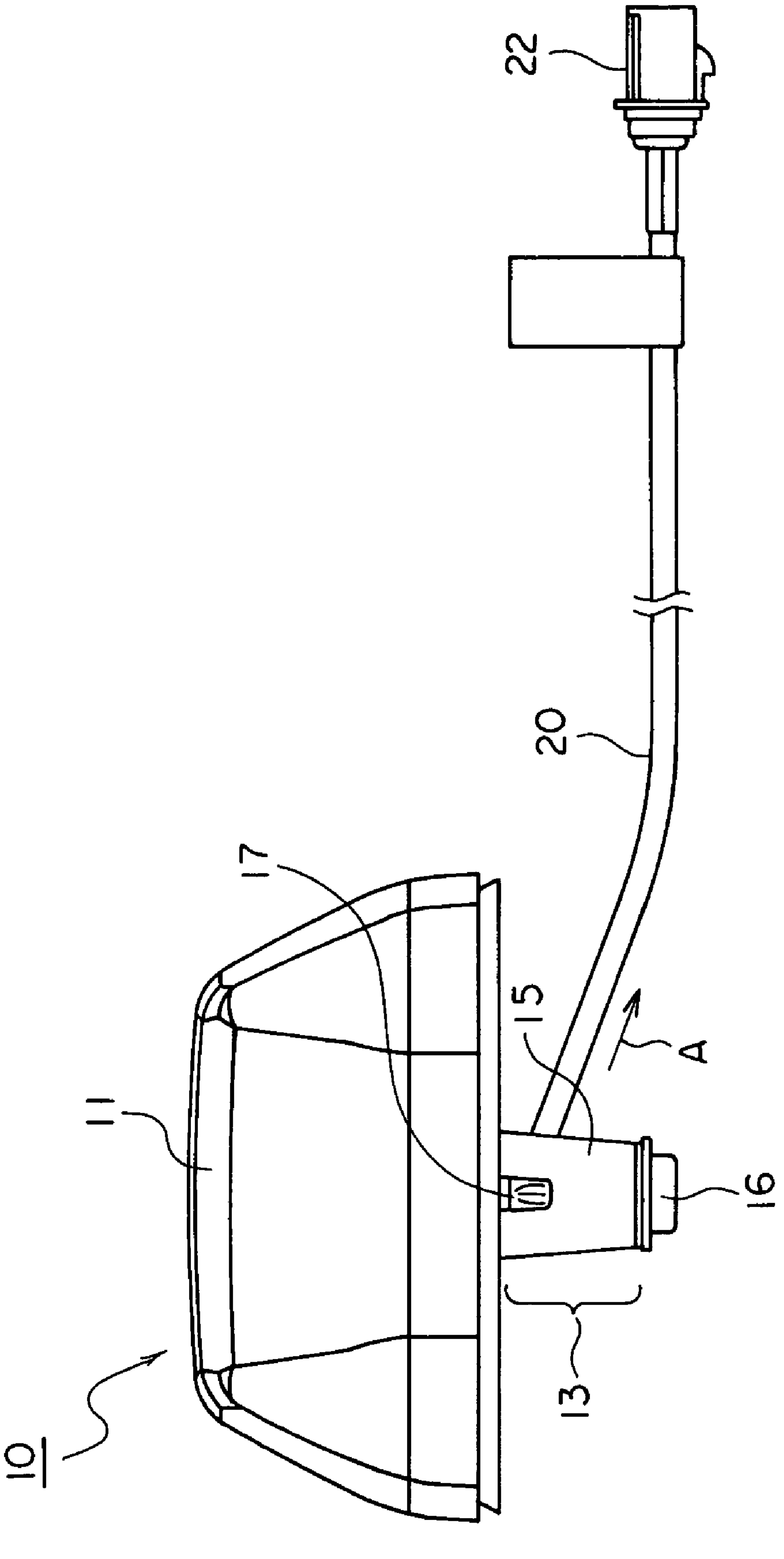
FIG. 1 is a front view of a related automobile antenna unit to which a cable is connected.
Figure 2:
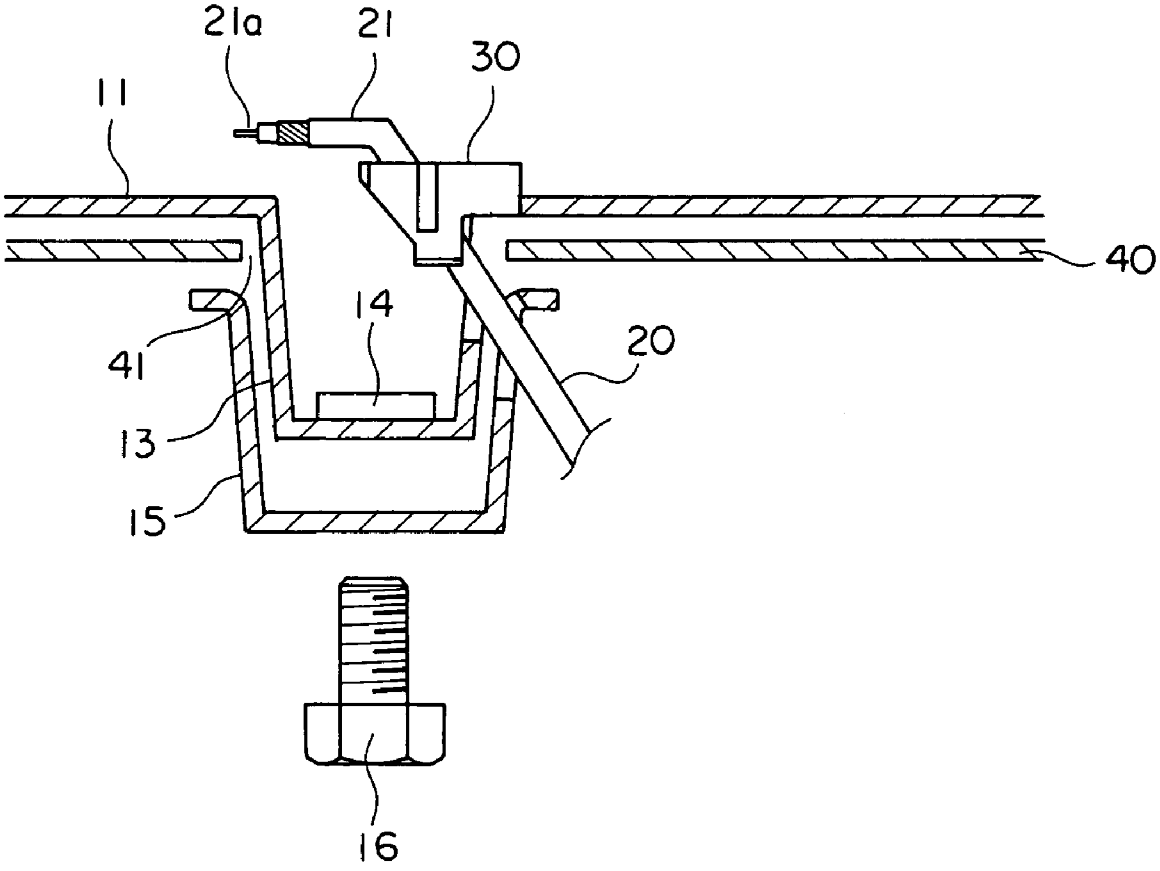
FIG. 2 is a schematic sectional view showing a state where the related automobile antenna unit illustrated in FIG. 1 is fixed to a roof of an automobile.

Referring to FIGS. 1 and 2, description will be at first directed to a related automobile antenna unit in order to facilitate an understanding of the present invention. FIG. 1 is a front view of the automobile antenna unit 10 to which a cable 20 is connected. FIG. 2 is a schematic sectional view showing a state where the automobile antenna unit 10 is fixed to a roof 40 of the automobile.

The automobile antenna unit 10 has a small dome-shaped case 11 to house an antenna element(s) (not shown) therein. A fixing portion 13 is formed at a center of a bottom (or base) of the case 11 with the fixing portion 13 projected from the bottom of the case 11. The fixing portion 13 is used for not only pulling the cable 20 out of the case 11 but also fixing the case 11 to the roof of the automobile. The cable 20 has one end portion 21 having a tip 21*a* connected to the above-mentioned antenna element(s). The fixing portion 13 has a bottom surface having an inner wall on which a female screw 14 is fixed. The illustrated cable 20 is a coaxial cable.

To mount or fix the automobile antenna unit 10 on the roof (or an outer panel) 40 of the automobile, a following working must be made. Specifically, a fixing hole 41 corresponding to the fixing portion 13 is formed in the roof 40 of the automobile. Subsequently, the fixing portion 13 is inserted into the fixing hole 41 from an upside of the roof 40. Upon inserting the fixing portion 13 into the fixing hole 41, the fixing portion 13 is inserted with a fixing attachment 15 attached to the fixing portion 13 by a male screw 16 threaded to the female screw 14. Thus, a part of the outer panel 40 is sandwiched between a part of the case 11 and the fixing attachment 15 thereby the antenna unit 10 is provisionally fixed to the roof 40 of the automobile. Thereafter, by tightening up the male screw 16 against the female screw 14, the antenna unit 10 is perfectly fixed to the roof 40 of the automobile.

In order to orient the automobile antenna unit 10 in a predetermined direction with respect to the automobile, the automobile antenna unit 10 includes a locator pin 17 formed on the bottom of the case 11 and the roof 40 of the automobile has a locating hole (not shown) corresponding to the locator pin 17.

As shown in FIG. 2, the one end portion 21 of the cable 20 is inserted in the automobile antenna unit 10 and is held in the automobile antenna unit 10 by a cable bush (or bushing) 30.

On the other hand, as shown in FIG. 1, the cable 20 has another end portion on which a plug 22 for connecting with a receiver (not shown) is mounted. After the automobile antenna unit 10 is fixed to the roof 40 of the automobile, the cable 20 is drawn around toward the receiver set in the automobile.

The cable 20 has a skin coated with polytetrafluoroethylene or PTFE. In addition, to the cable 20, the bushing 30 made of polyvinyl chloride or PVC is integrally molded by injection molding at the one end portion 21 thereof. Inasmuch as the polytetrafluoroethylene is a slippery material or has a small coefficient of friction, adhesion of the bushing 30 to the cable is poor.

In the manner which is described above, after fixing the automobile antenna unit 10 to the roof 40 of the automobile, the cable 20 is drawn around the automobile and the plug 22 of the cable 20 is connected to the receiver. On drawing around the cable 20, the cable 20 may be pulled in a direction indicated by an arrow A in FIG. 1 by a hand. Inasmuch as the skin of the cable 20 is made of the slippery material such as the polytetrafluoroethylene or PTFE, adhesion between the bushing 30 and the cable 20 is poor as described above. As a result, when the cable 20 is pulled by the hand in the direction indicated by the arrow A in FIG. 1, the bushing 30 may slide on the skin of the cable 20 such that the bushing 30 may shift on the cable 20, as mentioned in the Background of the Invention section of the instant specification. Accordingly, the tip 21*a*, which is connected to the antenna element(s), of the one end portion 21 of the cable 20 may be disconnected from the antenna element (s).

Figure 3:
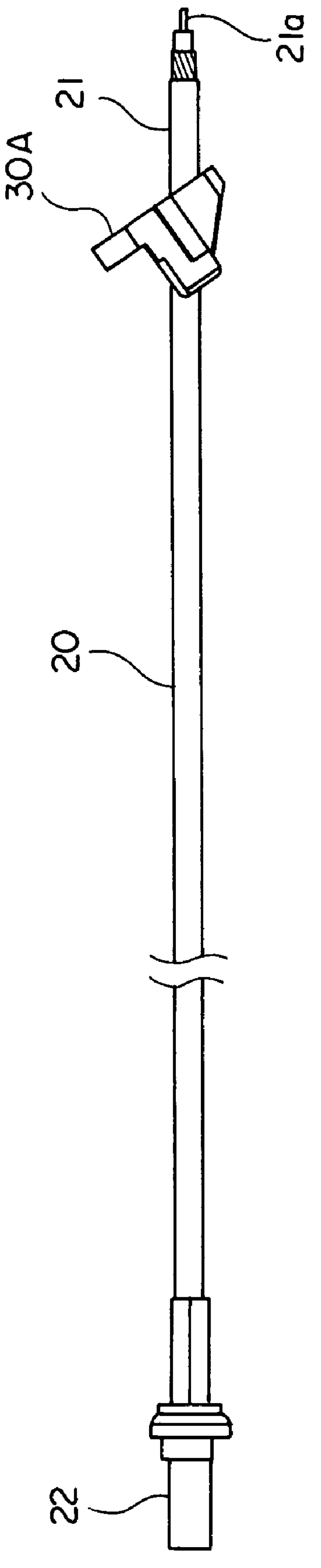
FIG. 3 is a front view showing a cable with a bushing according to an embodiment of this invention where a cable bush is mounted on the cable.
Figure 4A:
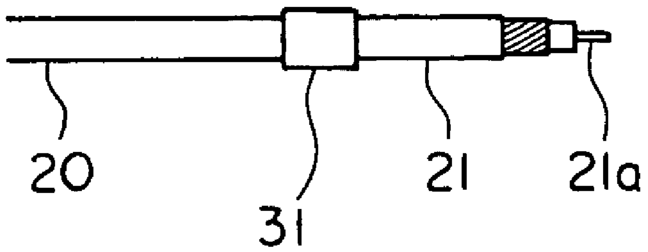
FIGS. 4A and 4B are views for use in describing a cable bush mounting method according to the embodiment of this invention.
Figure 4B:
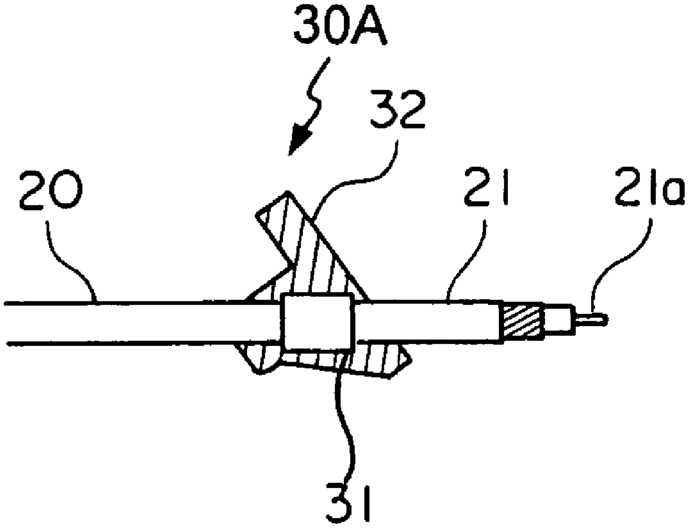

Referring to FIGS. 3, 4A and 4B, description will proceed to a cable bush mounting method according to a preferred embodiment of this invention. FIG. 3 is a front view showing a cable with a bushing according to the embodiment of this invention where a cable bush (or bushing) 30A is mounted on the cable 20. FIGS. 4A and 4B are views for use in describing the cable bush mounting method according to the embodiment of this invention. The cable 20 is a coaxial cable.

As shown in FIG. 4A, a washer 31 is mounted on the cable 20 at the one end portion 21 and the washer 31 is staked to the skin of the cable 20.

In addition, the skin of the cable 20 is coated with polytetrafluoroethylene or PTFE, as mentioned in the preamble of the instant specification. In the example being illustrated, the washer 31 is made of brass.

Subsequently, as shown in FIG. 4B, a bushing member (or a molded body) 32 is integrally molded on the washer 31 to the cable 20 by injection molding. In addition, the bushing member (molded body) 32 is made of polyvinyl chloride.

In the manner which is described above, the cable bush (bushing) 30A is mounted on the cable 20, as shown in FIG. 3.

That is, the bushing 30A comprises the washer 31 mounted on the cable 20 with the washer 31 staked to the skin of the cable 20 and the bushing member (molded body) 32 which is integrally molded to the cable 20 so as to cover the washer 31.

In the manner which is described above, according to this invention, the bushing 30A is mounted on the cable 20 by staking the washer 31 to the skin of the cable 20 and by integrally molding the bushing member (the molded body) 32 on the washer 31 to the cable 20. In other words, the bushing member (the molded body) 32 is integrally molded to the cable 20 through the washer 31 staked to the skin of the cable 20. Accordingly, it is possible to securely fix the bushing 30A to the cable 20.

Accordingly, even if the cable 20 is pulled by the hand in the direction depicted at the arrow A in FIG. 1 on drawing the cable 20 around the automobile, it is possible to prevent the bushing 30A from shifting on the cable 20 by sliding the bushing 30A on the skin of the cable 20. As a result, it is possible to prevent the tip 21*a* of the one end portion 21 of the cable 20, that is connected to the antenna element(s), from disconnecting from the antenna element(s).

While this invention has thus far been described in conjunction with a preferred embodiments thereof, it will now readily possible for those skilled in the art to put this invention into various manners. For example, although the slippery material for forming the skin of the cable 20 is polytetrafluoroethylene (PTFE) in the above-mentioned embodiment, the skin of the cable 20 may be made of one of other slippery materials. In addition, although the bushing member 32 is made of polyvinyl chloride (PVC) in the above-mentioned embodiment, the bushing member 32 may be made of one of other resins. Furthermore, the material of the washer 31 is not restricted to brass, the washer 31 may be made of one of other materials.

What is claimed is:

1. A method of mounting a cable bush on a coaxial cable having a skin, said method comprising:

staking a washer to the skin of said coaxial cable; and integrally molding a bushing member on said washer to said coaxial cable so as to cover all of said washer with the bushing member;

wherein the coaxial cable connects an antenna unit and a receiver and the cable bush holds an end of the coaxial cable in the antenna unit.

2. The method as claimed in claim 1, wherein the skin of said cable is made of a slippery material.

3. The method as claimed in claim 2, wherein the slippery material comprises polytetrafluoroethylene.

4. The method as claimed in claim 1, wherein the bushing member is made of polyvinyl chloride.

5. The method as claimed in claim 1, wherein said washer is made of brass.

6. A cable bush mounted on a coaxial cable having a skin, said cable bush comprising:

a washer staked to the skin of the coaxial cable to be mounted on said coaxial cable; and a bushing member which is integrally molded on said washer to said coaxial cable and covers all of said washer;

wherein the coaxial cable connects an antenna unit and a receiver and the cable bush holds an end of the coaxial cable in the antenna unit.

7. The cable bush as claimed in claim 6, wherein the skin of said cable is made of a slippery material.

8. The cable bush as claimed in claim 7, wherein the slippery material comprises polytetrafluoroethylene.

9. The cable bush as claimed in claim 6, wherein the bushing member is made of polyvinyl chloride.

10. The cable bush as claimed in claim 6, wherein said washer is made of brass.

11. A coaxial cable with a bushing mounted thereto, wherein said bushing comprises:

a washer staked to a skin of the coaxial cable to be mounted on said coaxial cables; and a bushing member which is integrally molded on said washer to said coaxial cable and covers all of said washer;

wherein the coaxial cable connects an antenna unit and a receiver and the bushing holds an end of the coaxial cable in the antenna unit.

12. The cable as claimed in claim 11, wherein the skin of said cable is made of slippery material.

13. The cable as claimed in claim 12, wherein said slippery material comprises polytetrafluoroethylene.

14. The cable as claimed in claim 11, wherein said bushing member is made of polyvinyl chloride.

15. The cable as claimed in claim 11, wherein said washer is made of brass.

16. An antenna unit comprising:

a case;

a coaxial cable extending from said case to connect the antenna unit to a receiver; and a bushing which is mounted on said coaxial cable and holds an end of the coaxial cable in the antenna unit;

wherein said bushing comprises:

a washer staked to a skin of the coaxial cable to be mounted on said coaxial cable; and a bushing member which is integrally molded on said washer to said coaxial cable and covers all of said washer.

17. The antenna unit as claimed in claim 16, wherein the skin of said cable is made of slippery material.

18. The antenna unit as claimed in claim 17, wherein said slippery material comprises polytetrafluoroethylene.

19. The antenna unit as claimed in claim 16, wherein said bushing member is made of polyvinyl chloride.

20. The antenna unit as claimed in claim 16, wherein said washer is made of brass.

* * * * *